Dec. 11, 1934.  C. A. PURDY ET AL  1,984,031
APPARATUS FOR TESTING AND SORTING ARTICLES
Filed Nov. 8, 1930   7 Sheets-Sheet 1

Inventors
C. A. Purdy
R. E. Park Jr.
By J. B. Whitfield Atty.

Dec. 11, 1934. C. A. PURDY ET AL 1,984,031

APPARATUS FOR TESTING AND SORTING ARTICLES

Filed Nov. 8, 1930 7 Sheets-Sheet 4

Inventors
C. A. Purdy
R. E. Park Jr.

Fig. 18.

Patented Dec. 11, 1934

1,984,031

UNITED STATES PATENT OFFICE 1,984,031

APPARATUS FOR TESTING AND SORTING ARTICLES

Chester A. Purdy, Oak Park, Ill., and Robert E. Park, Jr., Jersey City, N. J., assignors to Western Electric Company, Incorporated, New York, N. Y., a corporation of New York Application November 8, 1930, Serial No. 494,224

6 Claims. (Cl. 209—81)

This invention relates to an apparatus for testing and sorting articles, and more particularly to an apparatus for testing and sorting dielectrics used in the manufacture of electrostatic condensers.

An object of the invention is to test readily and accurately dielectrics and grade the dielectrics in accordance with their electrical properties.

In one embodiment of the invention a mechanism is provided for removing from a magazine, by means of a suction pad, a sheet of mica and depositing it on a turret which is rotated intermittently and which in its rotation places the mica in engagement with a testing electrode for determining the electrical qualities thereof. If the mica is incapable of withstanding the impressed voltage, mechanism is operated for rendering a pickoff mechanism ineffective when the turret reaches the next succeeding position, and when the turret reaches the second succeeding position mechanism is operated for removing the mica from the turret and depositing it in a magazine. However, if the mica satisfactorily withstands the applied voltage, the pickoff mechanism, at the next succeeding position from that in which the mica is subjected to test, is rendered effective to remove the mica at this position and deposit it in a magazine.

Other objects of the invention will be apparent from the following description when taken in connection with accompanying drawings, wherein.

Figures 1, 6:
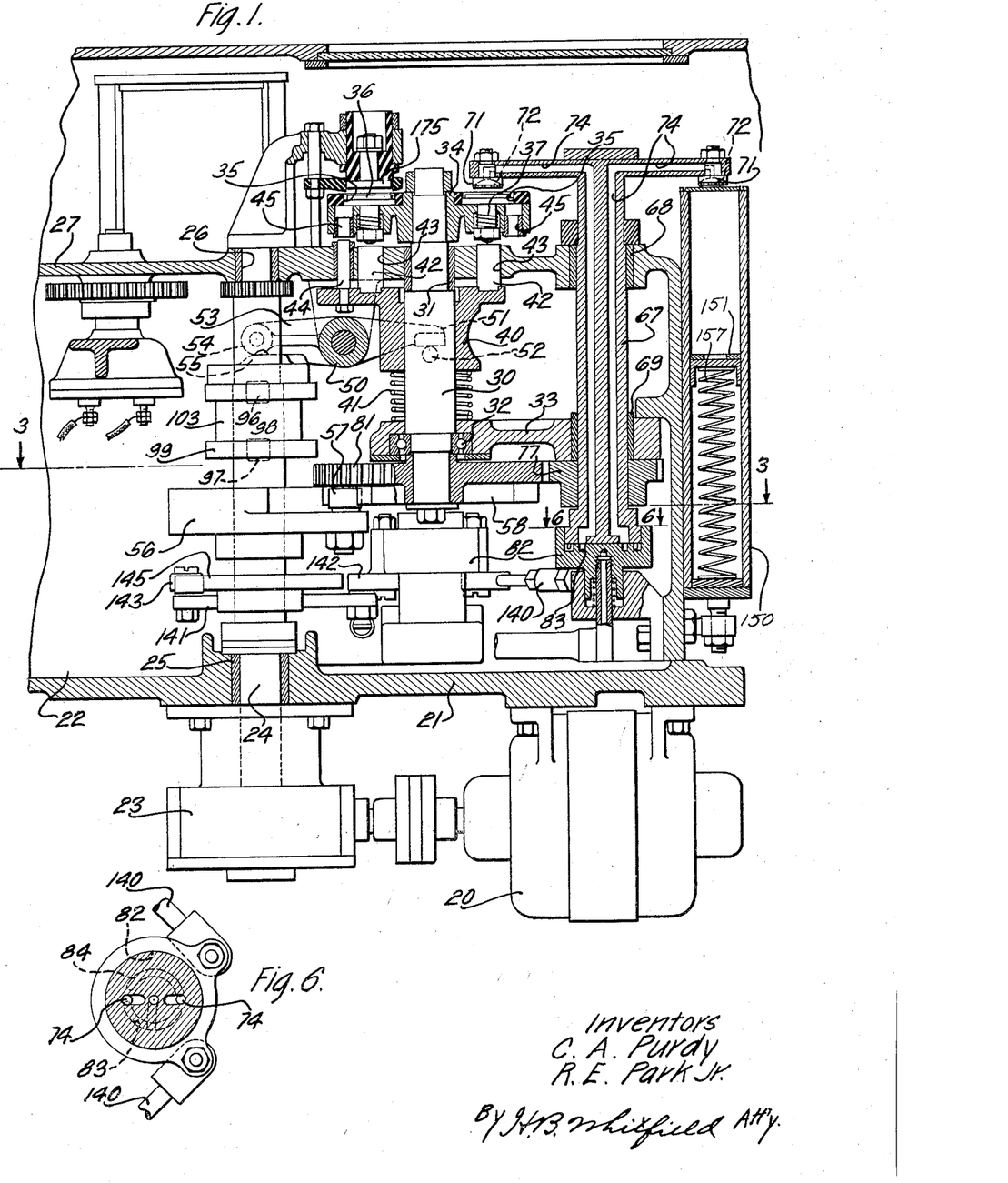
Fig. 1 is a fragmentary vertical sectional view of the apparatus.
Fig. 6 is an enlarged sectional view taken on the line 6—6 of Fig. 1.

Referring now to the drawings wherein like reference numerals designate the same parts throughout the several views, reference numeral 20 indicates a motor secured to a bottom wall 21 of a housing 22 and operatively connected to a speed reducer 23 which is also secured to the bottom wall 21 and operatively connected to a driven shaft 24 which extends vertically through a bearing 25 into the housing. The upper end of the shaft 24 is journaled in a bearing 26 in a top wall 27 of the housing 22. Spaced from the shaft 24 and extending through the top wall 27 is a turret shaft 30 journaled in a bearing 31 in the top wall 27 and a bearing 32 in a supporting bracket 33. A turret 34 is mounted upon the upper end of the shaft 30, and has an insulating cover plate provided with equally spaced apertures 35 therein in which are disposed spring pressed mica supports or platforms 36, the springs 37 thereof normally holding the supports 36 downwardly (Fig. 1). An actuating collar 40 (Fig. 1) is disposed concentric with the turret shaft 30 and adapted to be moved longitudinally relative thereto by a spring 41 which is disposed concentric with the turret shaft 30 and tends to move the collar upwardly. Equally spaced lifting plungers 42 are mounted upon the collar 40 and movably disposed in apertures 43 in the top wall 27. A guide pin 44 is also carried by the collar 40 and extends upwardly through the top wall 27 where it is adapted to be moved into sleeves 45 carried by the turret 34 and disposed adjacent the mica supports 36 so as to properly position the turret when at rest.

Positive means for moving the collar 40 downwardly against the tension of the spring 41 consists of a cam actuated yoke 50 pivotally carried by the top wall 27 and having its forked arms 51 positioned upon opposite sides of the collar in engagement with laterally extending pins 52 which are carried by the collar. Extending in the opposite direction from the forked arms 51 is a cam arm 53 having a cam roller 54 rotatably carried thereby and disposed in engagement with a cam 55, the latter being fixedly mounted upon the main shaft 24. A Geneva mechanism operatively connects the main shaft 24 with the turret shaft 30, and consists of a Geneva arm 56 mounted upon the main shaft 24 with a roller 57 operatively engaging a Geneva gear 58, which is mounted upon the lower end of the turret shaft 30, providing a means for imparting an intermittent rotary motion to the turret shaft 30 during the continuous rotation of the main shaft 24.

Disposed at spaced positions radially from the axis of the turret 34 are transmitting arms 62, 63 and 64 (Fig. 2) which have shaft portions 65, 66, and 67, respectively (Fig. 3), extending downwardly into the housing 22 and journaled in bearings 68 in the top wall 27 and in bearings 69 in the bracket 33. The arms 62, 63 and 64 have oppositely extending portions provided with suction pads 71 (Fig. 1) having a plurality of apertures 72 communicating with passageways 74 which extend inwardly through the oppositely extending portions of the arms from the suction pads 71 to positions short of the center of the shaft portions, and extend downwardly through the shaft portions (Fig. 1), thus providing separate passageways to each suction pad. Beneath the bracket 33 and mounted upon the shaft portions 65, 66, and 67, are relatively small gears 77, 78 and 79, respectively, (Figs. 1 and 3), which mesh with a relatively large gear 81, the latter being mounted upon the turret shaft 30 and adapted to rotate each of the transmitting arms and shafts one-half revolution during each quarter of a revolution of the turret shaft 30.

The lower ends of the shaft portions 65, 66, and 67 are mounted in rotatable air-sealed valves 82 (Fig. 1), which have arcuate shaped passageways 83 and 84 (Fig. 6) arranged to communicate with the passageways 74 of the shaft portions.

Figure 4:
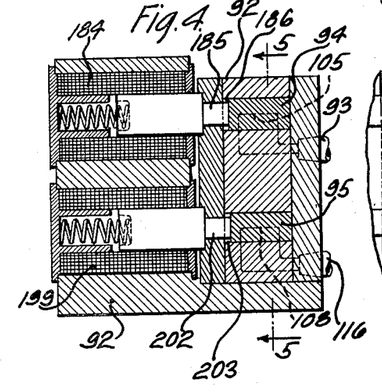
Fig. 4 is an enlarged sectional view of the valve mechanism taken along the line 4—4 of Fig. 2.
Figure 5:
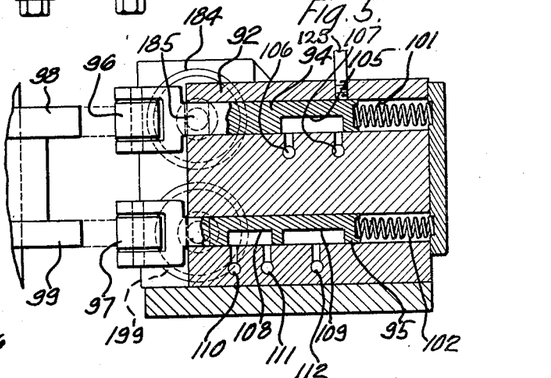
Fig. 5 is a sectional view taken substantially along the line 5—5 of Fig. 4.
Figures 7, 8, 9:
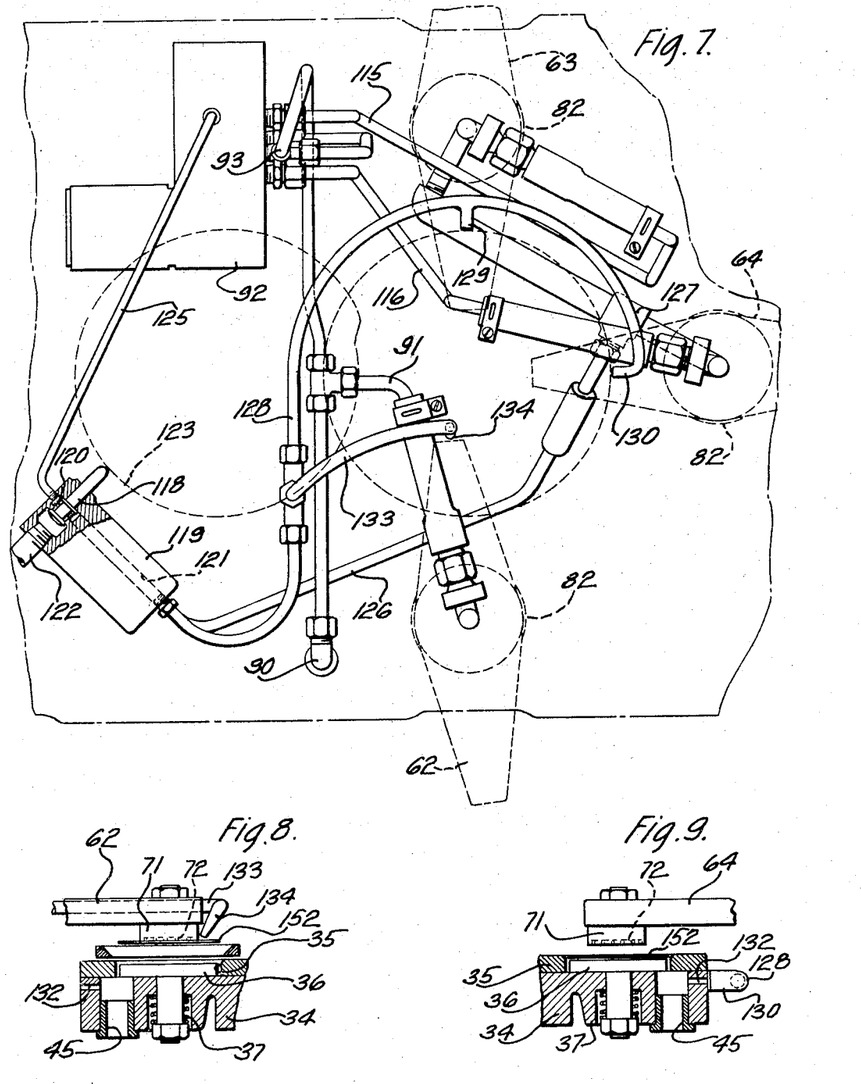
Fig. 7 is a plan view of the piping assembly for the vacuum supply and the compressed air supply.
Fig. 8 is a fragmentary detailed sectional view of the turret showing one of the air jets.
Fig. 9 is a fragmentary sectional view of the turret showing another of the air jets.

A means is provided whereby a vacuum may be created in the passageways 74 and the suction pads 71 for a purpose hereinafter described. In Fig. 7 there is illustrated a main vacuum line 90 which is connected directly to the rotatable valve 82 of the shaft portion 65 and to the rotatable valves 82 of the shaft portions 66 and 67 (Figs. 1 and 3), through control valves shown in Figs. 4 and 5. A pipe line connection 91 forms a communication between the vacuum line 90 and the rotatable valve 82 of the shaft portion 65, the main vacuum line 90 extending to a valve casing 92 and communicating with the interior thereof at 93. Slide valves 94 and 95 (Figs. 4 and 5) are disposed in the casing 92 and are provided with cam rollers 96 and 97 at the outer ends thereof which are held in engagement with cams 98 and 99, respectively, by springs 101 and 102, the cams being carried by a hub 103 which is fixedly mounted upon the drive shaft 24. The slide valve 94 has an aperture 105 therein arranged to provide and cut off communication between passageways 106 and 107 in the valve casing 92, and the valve 95 has apertures 108 and 109, the aperture 108 being arranged to provide and cut off communication between passageways 110 and 111, while the aperture 109 is arranged to provide and cut off communication between passageways 111 and 112. The main vacuum line 90 is connected to the casing 92 in communication with the passageways 106 and 112, thus supplying a vacuum which is controlled by valves 94 and 95. Communication between the passageway 107 in the valve casing 92 and the rotatable valve 82 for the shaft portion 66 is provided by a vacuum line 115. A vacuum line 116 provides communication between the passageway 111 and the rotatable valve 82 of the shaft portion 67. The passageway 110 is open to the air and permits the removal of the vacuum pressure from passageway 111 when the aperture 108 provides communication between passageways 110 and 111 by the operation of slide valve 95.

A compressed air system, shown in Fig. 7, consists of a cam actuated air valve 118 disposed in a casing 119 and normally held closed by a spring 120 to cut off communication between a passageway 121, within the casing, and a main air line 122. The valve 118 is actuated by a cam 123 which is mounted upon the drive shaft 24. Disposed in communication with one end of the passageway 121 is an air line 125 which extends to the valve casing 92 (Fig. 7) in communication with the passageway 107 when the valve 94 is in position which cuts off communication between passageways 106 and 107. The other end of the passageway 121 has an air line 126 which branches out at 127 and extends to the rotatable valves 82 of the shafts 66 and 67. Another air line 128 extends upwardly from the passageway 121 to a position adjacent the turret 34, where it extends in a semi-circular path, partially surrounding the turret, and is provided with spaced jets 129 and 130 which extend inwardly to positions adjacent the periphery of the turret. The jets 129 and 130 are so positioned that apertures 132 (Fig. 8) in the peripheral wall of the turret 34 will be positioned in alignment therewith after each intermediate movement of the turret (Fig. 9). A branch air line 133 disposed in communication with the air line 128 extends to a position above the turret 34 and has a jet 134 at the end thereof (Figs. 7 and 8) extending downwardly toward the turret.

The rotatable valves 82 (Figs. 1 and 3) are operatively connected to each other by adjustable links 140 so that they may be actuated simultaneously by movement of a bell crank cam lever 141, one end of which is connected to the valve 82 of the shaft 66 by a link 142, the other end having a cam roller 143 mounted thereon and held, by a spring 144, in operative engagement with a cam 145, the latter being mounted on the drive shaft 24.

Carried by the housing 22 and positioned adjacent to the shaft portion 65 is a supply magazine 150 (Figs. 2, 10 and 12) which has disposed therein a spring pressed supporting plunger 151 upon which a plurality of micas 152 are placed when they are supplied to the magazine. A cover 153 extends over a portion of the open end of the magazine to hold the micas in place, yet allowing an aperture, indicated at 154, sufficiently large for the removal of the micas singly from the magazine. The cover 153 is removably secured in place by screws 155 or the like. The plunger 151 has a hollow portion 156 in which the upper end of a spring 157 is positioned, the lower end of the spring resting upon an adjustable member 158, the latter being capable of varying the tension of the spring 157. A pin 160 carried by the plunger 151 and disposed in an elongated slot 161 in the magazine 150 guides the plunger in its vertical movement and holds it against rotation.

Figure 3:
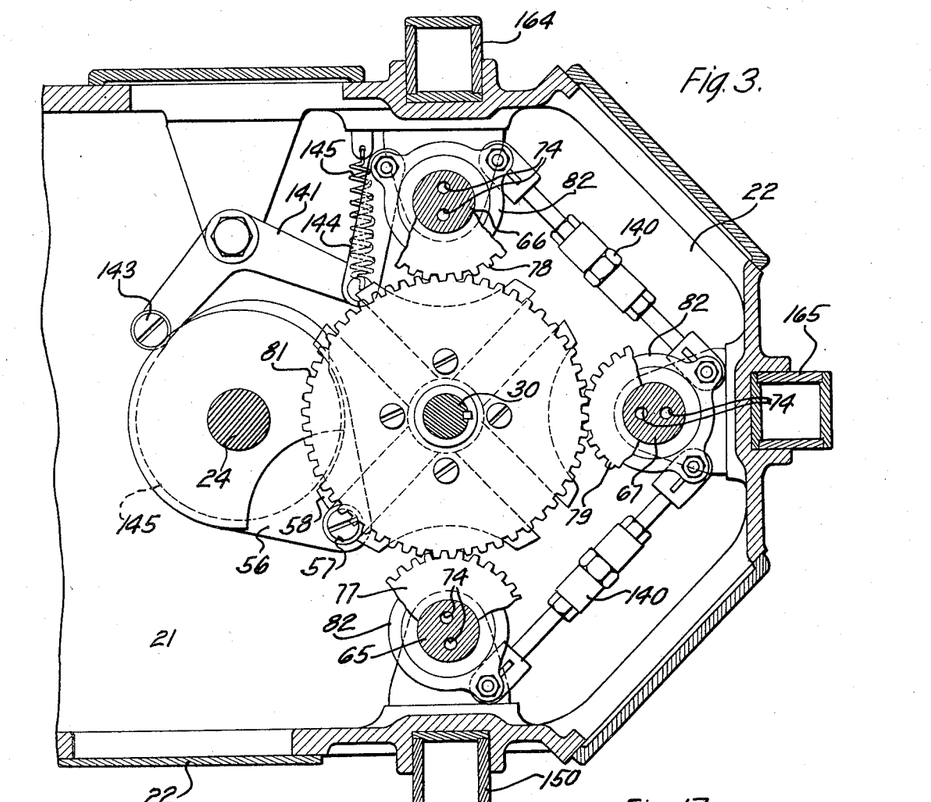
Fig. 3 is a sectional view taken substantially along the line 3—3 of Fig. 1.
Figures 10, 11, 12, 13, 14:
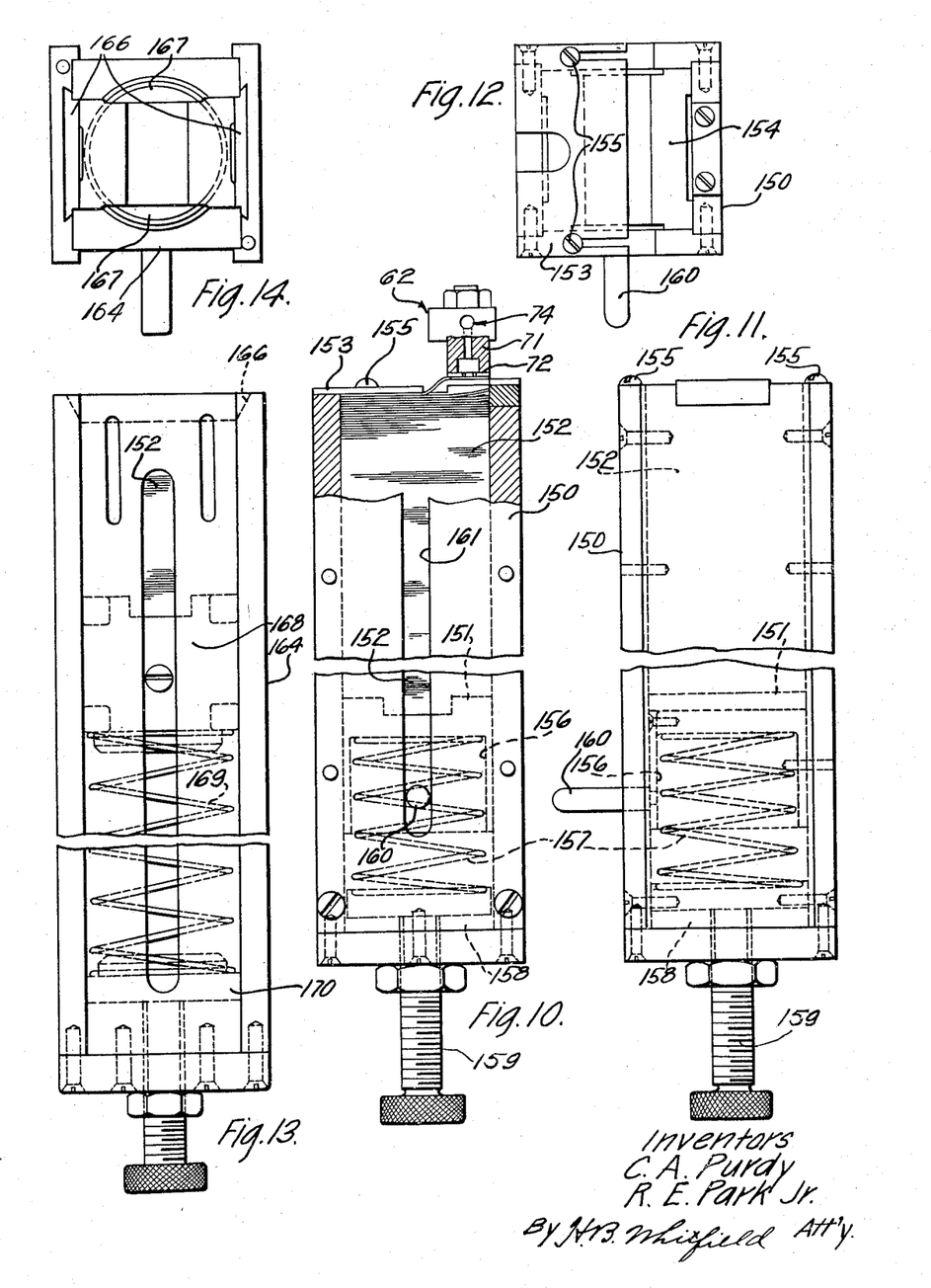
Fig. 10 is a front elevational view of the supply magazine.
Fig. 11 is a side elevational view of the supply magazine.
Fig. 12 is a top plan view of the supply magazine.
Fig. 13 is a front elevational view of one of the receiving magazines.
Fig. 14 is a top plan view of one of the receiving magazines.

Receiving magazines 164 and 165 are carried by the housing 22 and disposed adjacent the shaft portions 66 and 67 (Figs. 3, 13 and 14). These magazines have tapered openings 166 at the upper ends thereof and spaced retaining lips 167 which overhang the inner walls of the magazines, allowing sufficient space for the micas to be inserted therein, but so formed to retain the micas in the magazines. Within the magazines are disposed plungers or supporting members 168 forced upwardly toward the open end 166 by springs 169, the lower ends of the springs resting upon adjustable members 170, the purpose of the latter being to vary the tension of the springs 169.

Figures 15, 16:
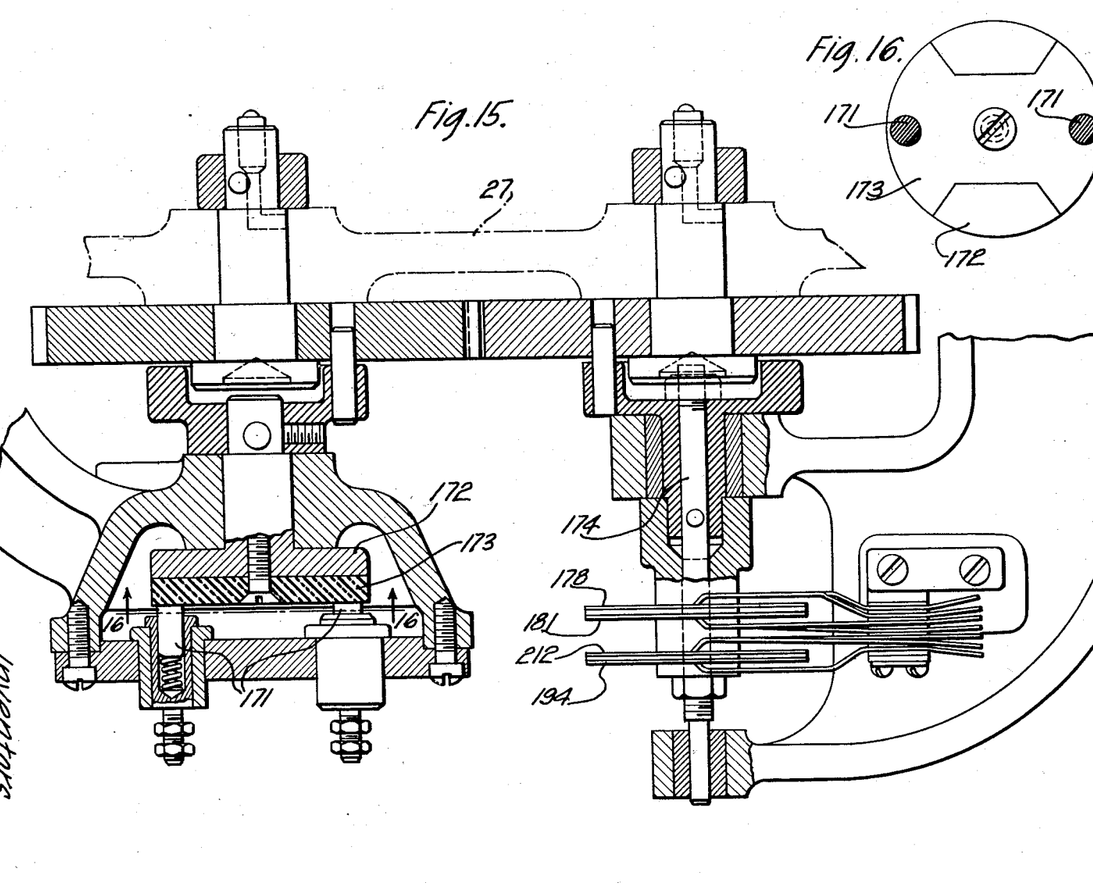
Fig. 15 is an enlarged sectional view taken along the line 15—15 of Fig. 2.
Fig. 16 is a sectional view taken along the line 16—16 of Fig. 15.

Inasmuch as there are four positions on the turret 34 for receiving micas, it is necessary to provide a mechanism for assuring that vacuum is applied to the suction pads 71 of the transmitting arms 63 and 64 at the proper times to cause the proper classification of the micas. The arrangement for obtaining this result and for testing the mica is shown in Figs. 15, 16 and 17.

Figure 17:
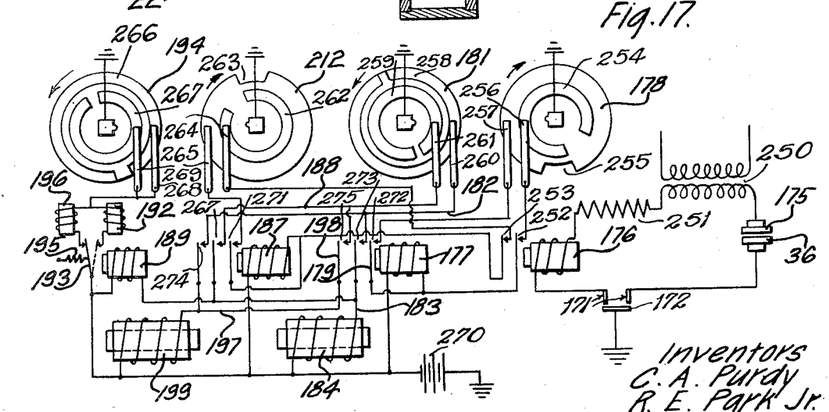
Fig. 17 is a wiring diagram illustrating features of the invention.

The electrical details are shown schematically in Fig. 17. The primary winding of a transformer 250 is connected to a suitable source of A. C. potential. The secondary winding of the transformer 250 is preferably connected in series with a suitable high resistance 251 the actuating winding of a relay 176 and rotary switch or interrupter 172 and its associated contacts 171 to the electrode 175 and supporting platform 36, between which electrode and platform the mica to be tested is interposed. Relay 176 has associated therewith two normal open switches 252 and 253. Four rotatable sequence switches 178, 181, 212 and 194 are employed, all of which are keyed to the same shaft 174 (Fig. 15). These sequence switches are preferably constructed of electrical conducting material and grounded on the machine. The sequence switch 178 has an insulating segment 254 and a portion cut away at 255 to prevent the contact arms 256 and 257 respectively from making contact with the conducting portion of the switch 178 during a portion of each revolution thereof. The sequence switch 181 has insulating segments 258 and 259 adapted to prevent contact arms 260 and 261 respectively, from making contact with the conducting portion of the switch 181 during a portion of each revolution thereof. The sequence switch 212 has an insulating segment 262 and a portion cut away at 263 to prevent contact arms 264 and 265 from making contact with the conducting portions of the switch during a portion of tion of each revolution thereof. The sequence switch 194 has insulating segments 266 and 267 adapted to prevent the contact arms 268 and 269 respectively from making contact with the conducting portion of the switch during a portion of each revolution thereof. The arrows show the direction of rotation of the switches 181 and 194 as opposite to that of switches 178 and 212. This corresponds to the construction shown in Fig. 15 in which the switches 181 and 194 and their associated contact arms are shown assembled beneath the switches 178 and 212 and all four switches rotating in the same direction. The contact arm 256 of sequence switch 178 is connected to one spring of the switch 252 on relay 176. The other spring of the switch 252 is connected through the winding of relay 177 and a suitable source of potential or battery 270 to ground. The contact arm 264 of sequence switch 212 is connected to one spring of the switch 253 on relay 176. The other spring of the switch 253 is connected through the winding of relay 187 to the ungrounded side of battery 270 and also to one spring of a normal open switch 271 on the relay 187. The other spring of the switch 271 is connected to the contact arm 265 of sequence switch 212. The contact arm 257 of sequence switch 178 is connected to one spring of a normal open switch 272 on relay 177. The other spring of contact 272 is connected to the connection of the winding of relay 177 and the spring of switch 252. Contact arm 260 of sequence switch 181 is connected to one spring of the normal open switch 273 on relay 177 and one spring of the normal open switch 274 on relay 187. The other spring of switch 273 is connected to one winding terminal of a solenoid 184, the other winding terminal of which is connected to the ungrounded side of battery 270. The other spring of switch 274 is connected to one winding terminal of solenoid 199, the other winding terminal of which is connected to the ungrounded side of battery 270. One spring of a switch 275 on relay 177 is connected to the connection of the winding of solenoid 199 and the spring of switch 274 of relay 187. One spring of switch 276 on relay 187 is connected to the connection of the winding of solenoid 184 and the spring of switch 273. The other springs of switches 275 and 276 are connected to the contact arm 261 of sequence switch 181. One terminal of the winding of relay 189 is connected to the ungrounded side of battery 270 and the other terminal of this winding is connected to the connection of the springs of switches 273 and 276 and the winding of solenoid 184. The contact arms 268 and 269 on sequence switch 194 are connected together and to one winding terminal of each of counters 192 and 196. The other winding of terminals of counters 192 and 196 are arranged to contact with switch 193 on relay 189. The switch 193 is connected to the connection of the winding of relay 189 and battery 270. In Figs. 15 and 16 spring contacts 171 are connected in a circuit of a desired voltage and are held in engagement with a rotating switch 172, having an insulating spacer 173. The rotatable switch 172 is geared with equal ratio to a shaft 174 for sequence switches which are hereinafter described. To test the mica, an electrode 175 (Figs. 1 and 17) extends through an insulating member and is positioned so that the supporting platforms 36 in the turret 34 will be moved intermittently into general alignment therewith for positioning the mica in close engagement therewith and serve as electrodes while in this position. While the mica is positioned between the electrodes 175 and 36 it is subjected to a predetermined high voltage and, should it have any defective areas, current will flow between the electrodes 175 and 36 and cause the energization of a relay 176 which is in the same circuit (Fig. 17). The relay 176, in energizing, conditions an energizing circuit relay 177 which is controlled by conducting segments on a sequence switch 178 and is locked up through its own contacts; that is, independently of the contacts of the relay 176. The first contact 179 which is closed by the energization of the relay 177 locks the relay 177 through the next two succeeding cycles of the sequence switches. At a proper time during the cycle a sequence switch 181 will complete a circuit 182 and as the second contact 183 is closed by the relay 177 a solenoid 184 will be energized. The energization of the solenoid 184 withdraws a latch 185 (Figs. 4 and 5) from a recess 186 in the valve 94, thus releasing the valve and allowing the spring 101 to move the valve into closed position. The closing of the circuit 182 also energizes a relay 187 which closes a triple contact switch and completes a counter circuit 188 through a relay 189 so as to register a defective or "B" grade of mica.

The counter unit is indicated generally at 192 for registering the "B" grade mica when a switch 193 is closed due to the energization of the relay 189 and by the closing of the switch 193 a circuit is closed through a sequence switch 194 to energize the counter unit 192. The switch 193 is normally held in a position shown in a solid line in Fig. 17 by a spring 195 and when the mica, being tested, is not defective a counter mechanism 196 will be energized through the sequence switch 194.

By the energization of the relay 187 a circuit 197, including the third contact 198, which is closed by relay 177, is completed, energizing a solenoid 199 which removes a latch 202 from a recess 203 in the valve 95, thus releasing the valve and allowing the spring 102 to move the valve into open position. This renders the arm 64 effective and the mica which is found defective during the breakdown test is picked up and disposed in the adjacent receiving magazine 165 which is at the fourth position.

Figure 2:
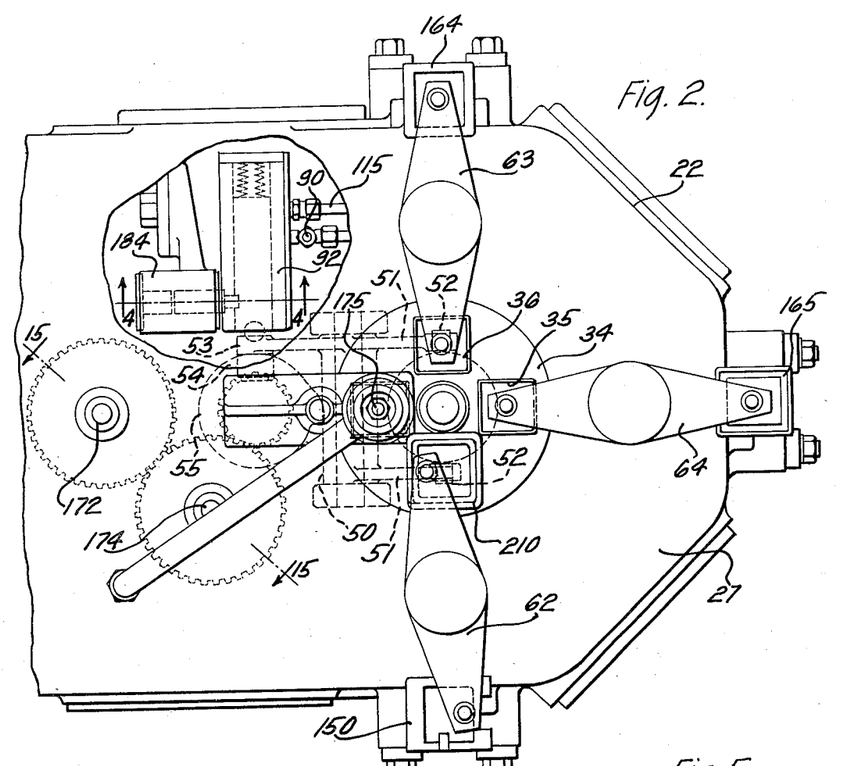
Fig. 2 is a top plan view of the apparatus with the cover removed and a portion being broken away.

In preparing the apparatus for operation, the supply magazine 150 is filled with micas 152 and the cover 153 is secured in place. The motor 20 is then energized, causing an actuation of the drive shaft 24 through the speed reducer 23 and due to the operative connection of the drive shaft 24 with the turret shaft 30 through the members 56, 57 and 58 of the Geneva mechanism, the turret 34 is rotated intermittently placing one of the mica supports 36 in a position for receiving a mica from the transmitting arm 62. While the turret 34 is being moved to this position, the arm 62 is being actuated so that the suction pad 71, at one end thereof, will be moved over the top of the supply magazine 150 and due to vacuum in the apertures 72 of the suction pad 71 and the passageway 74 communicating therewith, the topmost mica will be withdrawn from the magazine 150, from beneath the cover 153, and moved to a position above a chute 210 (Fig. 2). When the suction pad 71, carrying the mica, reaches this position the arm 62 is at rest due to the fact that the arm is synchronized in its movement with the turret and while the arm is in this position the rotating valve 82, co-operating therewith, is moved, due to the movement of the bell crank cam lever 141 through its connection with the cam 145, so as to disconnect the vacuum from the vacuum pad carrying the mica. Immediately after the vacuum is disconnected from the suction pad 71 carrying mica, the air valve 118 is actuated due to the rotation of the cam 123 and air under pressure is directed to the upper surface of the mica through the jet 134 (Figs. 7 and 8) to free the mica from the suction pad 71 and direct it through the chute 210 which positions it correctly upon the mica support 36 disposed therebeneath. This illustrates the manner in which one mica is removed from the magazine 150 due to vacuum being created in the suction pad 71 and passageway 74, delivered to a position above the mica support 36 in the turret 34, freed from the suction pad and guided to the mica support. While the vacuum is disconnected from the suction pad 71 of the portion of the arm 62 above the turret 34, by the actuation of the rotating valve 82 for the arm 62, the vacuum line is opened to the suction pad 71 above the magazine 150, thus causing the removal of another mica from the magazine during the next intermittent movement of the arm 62 and the turret 34. In this manner a new mica is supplied to one of the mica supports in the turret after each intermittent movement thereof.

After receiving the mica from the transmitting arm 62, the mica is positioned beneath the electrode 175 and while the turret 34 is at rest to receive the next mica, the collar 40 is forced upwardly by the spring 41, when released by the yoke 50 due to the cam roller 54 riding upon the low portion of the cam 55. The upward movement of the collar 40 moves the guide pin 44 into the adjacent sleeve 45 of the turret, locking the turret against rotation while the lifting plungers 42 move the mica supports 36 upwardly to position the mica support, in the first position, adjacent the suction pad 71 of the arm 62 for receiving the mica therefrom and force the mica support in the second position in close engagement with the electrode 175. While the mica at the second position is held in close engagement with the electrode 175, a predetermined high voltage is applied thereto by the rotatable switch 172 bridging the contacts 171. The actuation of the switch 172 is governed by the drive shaft 24 to which it is operatively connected (Fig. 2). The result of this breakdown test governs whether or not the transmitting arm 63 or 64 will be made effective for removing the tested mica from the turret 34.

If there are no defective portions in the mica there will not be a leakage of current therethrough and the relay 176 will not be energized. Therefore, as the valve 94 is locked in the open position by the plunger 185, the valve having been moved into this position by the cam 98, vacuum will be applied to the suction pad 71 of the arm 63 above the turret 34 to receive the mica previously tested. As stated heretofore, the transmitting arms 62, 63 and 64 are synchronized in their movement with the turret 34, therefore while the mica, just tested, is being moved to the third position, the arm 63 is rotated one-half of a revolution to position one of the suction pads 71 carried thereby above the tested mica. While the turret 34 and the transmitting arm 63 are at rest, the air valve 118 will be moved into open position to allow air under pressure to pass through the air line 128 and the jet 129, thus directing air under pressure through the adjacent aperture 132 in the peripheral wall of the turret. The air entering the turret at this position under pressure will dissipate the charge in the mica and free the mica from the mica support 36 so that the mica may be drawn into engagement with the adjacent suction pad 71 by the vacuum created therein. At the next intermittent movement of the turret 34 the end of the arm having a suction pad, which is carrying the mica received from the turret, is moved into general alignment with the receiving magazine 164 and while the arm is at rest in this position, the air valve 118 is again actuated, allowing air under pressure to pass through the air line 126 where it is directed outwardly to the passageway 74, leading to the suction pad 71 carrying the mica, thus forcing the mica free of the suction pad when the rotatable valve 82 for the arm 63 is actuated, by movement of the bell crank lever 141, to cut off the vacuum supply to the arm. The mica freed by the arm 63 is forced into the magazine 164. This operation occurs whenever a grade "A" mica; that is, a mica which is not defective, passes from the second position into the third position.

If the mica should be defective, sufficiently to allow a surge of energy to leak therethrough, when the high voltage is applied thereto, the relay 176 will be energized, thus causing the adjacent switches to close and energize the relay 177, the latter being locked up through the sequence switch 178 to the contact 179. At a proper time during the cycle of the sequence switches, the solenoid 184 is energized, releasing the valve 94 and allowing the spring 101 to move the valve 94 into closed position. This provides communication between the compressed air passageway 125 through the valve casing 92 (Fig. 7) and passageway 107 (Fig. 5) thereby preventing the air which passes through aperture 132 (Fig. 8) from blowing the defective mica up to the suction pad of the arm 63. The closing of the triple switch by the relay 177 energizes the relay 187, which also closes a triple switch, closing a circuit through the sequence switch 181 for energizing the solenoid 199, thus releasing the valve 95 and allowing the spring 102 to move it into open position rendering the transmitting arm 64 effective. The relay 187 is locked up through its contacts by the other sequence switch 212. If the mica is tested by the application of the high voltage and proven defective, the transmitting arm 63 is rendered ineffective and the transmitting arm 64 is rendered effective. This condition remains until the defective mica passes the second position in the turret, and is picked up by the transmitting arm 64 at the fourth position in the turret. While at this position, the valve 118 is actuated, allowing air under pressure to pass through the air line 128 and be directed through the jet 130 and into the turret 34 through the adjacent aperture 132 where it will contact with the mica at this position dissipating the charge and freeing the mica from the mica support 36 where it will be received by the adjacent suction pad 71 of the transmitting arm 64. The vacuum having been applied to the suction pad 71 due to the opening of the valve 95, the mica will be drawn to and held by the suction pad 71 until it is positioned above the receiving magazine 165, where it will be released by the actuation of the rotatable valve 82 for the transmitting arm 64, thus disconnecting the vacuum supply and by a simultaneous introduction of air under pressure, due to the opening of the valve 118, the mica will be forced into the magazine 165. These operations are continued and are governed by the condition of the mica being tested.

During each rotation of the drive shaft 24, the turret 34 is moved intermittently one-fourth of a revolution and the transmitting arms 62, 63 and 64 are rotated intermittently one-half of a revolution. Furthermore, while the turret 34 and the transmitting arms 62, 63 and 64 are at rest, the collar 40 is moved upwardly by the spring 41, when freed by the yoke 50, so as to position the mica supports 36 in the first, third and fourth positions adjacent suction pads of the transmitting arms and in the second position in close engagement with the electrode 175 where the mica receives its test. Furthermore, during each rotation of the drive shaft 24, the cams 98 and 99 will move the valves 94 and 95 into their locked positions where they will be held until released due to the result of defective micas. The rotatable valves 82 are also actuated at a proper time during each rotation of the shaft 24 so as to turn on and cut off the vacuum to the transmitting arm at proper sequence.

By the valve 94 being locked in open position and the valve 95 being locked in closed position, the transmitting arm 63 remains effective for removing micas from the turret until a defective mica is tested, which will release the valves 94 and 95 by the electrical means shown in Figs. 15, 16, and 17, thus rendering the transmitting arm 63 ineffective and the transmitting arm 64 effective. However, after the defective mica passes the third position, and a new mica has been tested at the second position, the valve 94 will again be locked in open position through the actuation of the cam 98 and if the mica just tested in the second position and moved to the third position proves to be in good condition, the mica will be removed from the turret at the third position by the transmitting arm 63, while the defective mica is removed from the turret at the fourth position by the transmitting arm 64. The position of the air jets 129 and 130 permit the micas, at the third and fourth positions, to be released from the mica supports by the air forced under the mica.

When all of the micas have been removed from the supply magazine 150, the micas having been fed upwardly toward the open end of the magazine by the spring pressed plunger 51, a new supply of micas, to be tested, may be disposed in the magazine by removing the cover 153 and subsequently inserting the cover in place. As the tested micas are fed into the receiving magazines 164 and 165, the spring pressed plungers 168 are forced downwardly against the tension of the springs 169 until the magazines are filled, after which the micas may be removed therefrom by removing the bottom members of each of the magazines.

Figure 18:
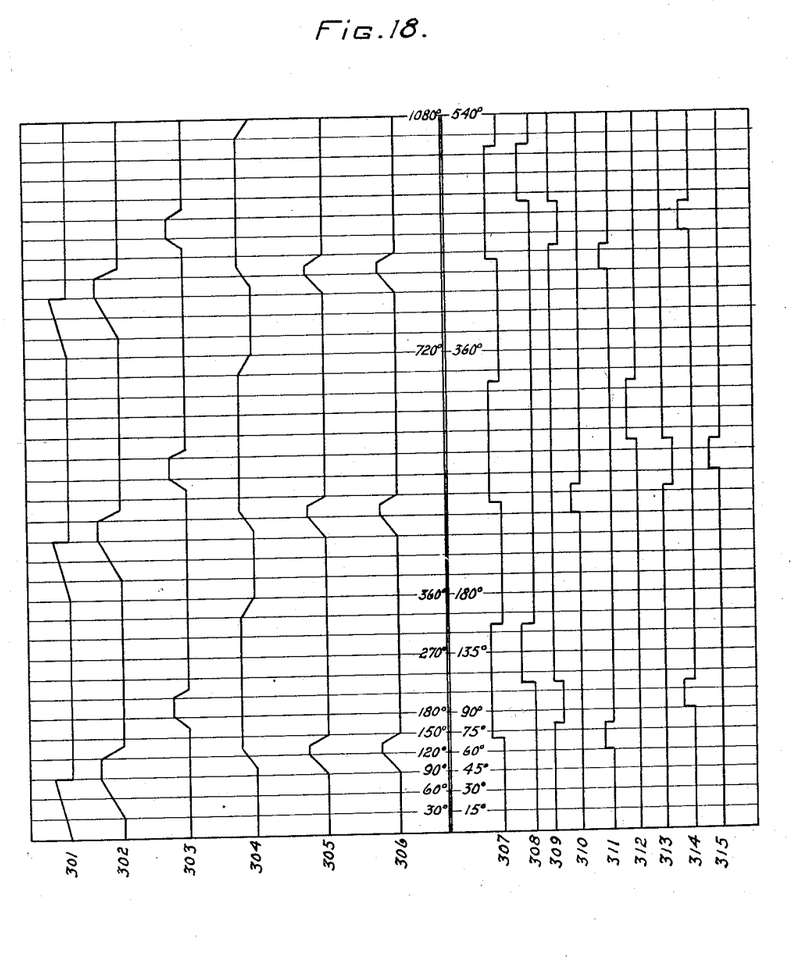
Fig. 18 is a timing diagram of several of the details of the apparatus.

In the diagram, Fig. 18, is shown the approximate relative times at which the cams associated with several of the details of the machine actuate these details and the relative times the conducting portions of the sequence switches are in contact with their associated contact arms as compared with each operation cycle of the turret 34. Three cycles of operation of the turret are shown. As the electrical equipment has a one to two ratio of rotation with respect to the mechanical equipment only one and one-half cycles of the electrical equipment occur in three operation cycles of the turret. Graph 301 shows that the cam associated with the turret 34 causes the turret 34 to index during the first quarter of each cycle and to remain at rest during the remaining three quarters.

Graph 302 shows the relative time of actuation of the rotatable valves 82 to which connects the vacuum line to the suction pads 71 and disconnect it therefrom.

Graph 303 shows the relative time of actuation of the compressed air valve 118. As shown the valve is open for a short interval directly after the vacuum is disconnected from the suction pads 71 (Graph 302).

Graph 304 shows the relative time of actuation of the mica support to hold the electrode 175 in engagement with the mica under test. This is done during the time the turret 34 is at rest.

Graphs 305 and 306 show the relative times of movement of the slide valve cams 98 and 99 which control the slide valves 94 and 95, respectively. As shown the changes in the position of the valves 94 and 95 (when the condition of the mica being tested requires such a change) are made at approximately the same time that the vacuum is being disconnected from the suction pads 71 (Graph 302).

Graph 307 shows the action of the rotary switch or interrupter 172 which controls the opening and closing of the circuit in which the secondary winding of transformer 250 is connected. The secondary winding is shown connected during the time that the electrode 175 is in engagement with the mica under test (Graph 304).

Graph 308 shows the short intervals of time during which the contact arm 256 is in contact with the contacting portion of sequence switch 178.

Graph 309 shows the short intervals of time during which contact arm 257 is not in contact with contacting portions of sequence switch 178.

Graphs 310 and 311 show the short intervals of time in which contact arms 260 and 261 are in contact with the contacting portion of sequence switch 281.

Graph 312 shows the short interval of time in which contact arm 264 is in contact with the contacting portion of sequence switch 212.

Graph 313 shows the short interval of time in which contact arm 265 is not in contact with the contacting portion of the sequence switch 212.

Graphs 314 and 315 show the short interval of time in which contact arms 268 and 269 are in contact with the contacting portion of sequence switch 194.

Although the invention has herein been described in connection with a particular type of material being tested, it is to be understood that the invention is capable of many other applications and should be limited only by the scope of the appended claims.

What is claimed is:

1. In an apparatus for testing and sorting articles, a conveying member for receiving the articles, means for testing the articles disposed upon said conveying member, a removing means normally effective for removing the articles tested upon said conveying member, a second removing means for removing defective articles from said conveying member, means responsive to the test of a defective article for rendering said first named removing means ineffective and rendering said second named removing means effective for removing the defective article from said conveying member, and means comprising continuously rotating sequence switches and electromagnets associated therewith for rendering said first named removing means effective whereby an article may be removed from said conveying member by said first named removing means simultaneously with the removal of the defective article by said second named removing means.

2. In an apparatus for testing and sorting articles, a conveying member for receiving the articles, means for testing articles disposed upon said conveying member, a removing member normally operative for removing the tested articles from said conveying member, a second removing member for removing defective articles from said conveying member and normally inoperative, and means responsive to the test of a defective article for rendering said first named removing means inoperative and rendering said second named removing means operative for removing the defective article from said conveying member, said responsive means comprising a cam actuated slide valve and a plurality of continuously rotating sequence switches and electromagnets cooperating therewith and actuated by the testing means to operate the cam actuated slide valve selectively according to the results of the test to render the two article removing means alternatively operative.

3. In a machine for testing an electrical property of articles, a stationary base, a stationary magazine mounted on the base for articles to be tested and sorted, a conveyor associated with and movable past the magazine and having spaced article receiving members thereon, a transfer device mounted on the base between the magazine and the conveyor to pick up articles from the magazine and transfer them to the members, a stationary article testing means mounted on the base and associated with the conveyor and having means to test an electrical property of the articles, a perfect article removing means also stationarily mounted on the base and normally operative to remove an article from the conveyor, an imperfect article removing means also stationarily mounted on the base and normally inoperative to remove an article from the conveyor, means to advance the conveyor in step by step progress past the magazine and the testing means and the two article removing means, and means controlled by the testing means to prevent actuation of the perfect article removing means and to effect actuation of the otherwise inoperative imperfect article removing means.

4. In a machine for testing an electrical property of articles, a rotary conveyor, a stationary base having four operating stations surrounding the conveyor, a supply magazine for articles to be tested, a transfer device mounted at the first station on the base between the magazine and the conveyor to pick up and transfer an article to be tested from the magazine to the conveyor, means mounted at the second station on the base to test an electrical property of the article on the conveyor, a receiving magazine mounted on the base at the third station, a transfer device mounted at the third station on the base between the magazine and the conveyor to pick up a tested article from the conveyor and place the same in the receiving magazine, a second receiving magazine at the fourth station, a transfer device mounted at the fourth station on the base between the second receiving magazine and the conveyor to pick up a tested article from the conveyor and place the same in the second receiving magazine, means controlled by the testing means to prevent actuation of the second named article transfer device, and means to operate the conveyor, the article testing means, and the three article transfer devices in co-operative synchronism.

5. In a machine for testing an electric property of articles, a rotary conveyor, a stationary base surrounding the conveyor, means to load the conveyor with articles to be tested, a device mounted on the base to test the articles, a first article removing device mounted on the base to remove articles from the conveyor, a second article removing device mounted on the base also to remove articles from the conveyor, means to drive the conveyor and to actuate the testing device and the two article removing devices in synchronism therewith, and means controlled by the testing device to render either of the article removing devices inoperative upon the occurrence of a predetermined test result, comprising a solenoid connected in a circuit of the testing device, a switch operated thereby to close a circuit including a plurality of rotating sequence switches driven by the synchronizing driving means and also including means to control the actuation of each of the two article removing devices.

6. In a machine for testing articles, a base, a conveyor associated therewith to transport articles, to be tested, means to load the conveyor with articles to be tested from a supply thereof, and means to test the articles while on the conveyor, in combination with means to transfer the tested articles from the conveyor comprising a shaft rotatably mounted in the base and carrying a radial transfer arm provided with pneumatic means to pick up and to release an article, and means to drive the conveyor and to actuate the article transfer means in synchronism with the conveyor.

CHESTER A. PURDY.
ROBERT E. PARK, Jr.